United States Patent
Duval et al.

(10) Patent No.: US 10,851,223 B2
(45) Date of Patent: Dec. 1, 2020

(54) USE OF A CYCLODEXTRIN POLYCONDENSATE OR A COMPOSITION COMPRISING SUCH A POLYCONDENSATE, AS A CAPTURING AGENT

(71) Applicants: Bertrand Duval, Maule (FR); Fabrice Grenard, Paris (FR); Jean-Baptiste Loiseau, Paris (FR); Bernard Rougier, Paris (FR)

(72) Inventors: Bertrand Duval, Maule (FR); Fabrice Grenard, Paris (FR); Jean-Baptiste Loiseau, Paris (FR); Bernard Rougier, Paris (FR)

(73) Assignee: BIOSTART, Évry-Courcouronnes (FR)

( * ) Notice: Subject to any disclaimer, the term of this patent is extended or adjusted under 35 U.S.C. 154(b) by 32 days.

(21) Appl. No.: 16/075,454

(22) PCT Filed: Feb. 3, 2017

(86) PCT No.: PCT/EP2017/052434
§ 371 (c)(1),
(2) Date: Aug. 3, 2018

(87) PCT Pub. No.: WO2017/134250
PCT Pub. Date: Aug. 10, 2017

(65) Prior Publication Data
US 2019/0055379 A1 Feb. 21, 2019

(30) Foreign Application Priority Data

Feb. 5, 2016 (FR) .................................... 16 50943

(51) Int. Cl.
*C08L 5/16* (2006.01)
*C08B 37/16* (2006.01)
(Continued)

(52) U.S. Cl.
CPC ................ *C08L 5/16* (2013.01); *B01D 53/64* (2013.01); *B01J 20/24* (2013.01); *C02F 1/286* (2013.01);
(Continued)

(58) Field of Classification Search
CPC .... C08L 5/16; C08L 29/04; C02F 1/70; C02F 1/285; C02F 2101/327; C02F 2101/20;
(Continued)

(56) References Cited

U.S. PATENT DOCUMENTS

2011/0097557 A1* 4/2011 May .................... C08J 7/0427
428/195.1

FOREIGN PATENT DOCUMENTS

WO 2011/080421 A1 7/2011
WO 2011/080422 A1 7/2011
(Continued)

OTHER PUBLICATIONS

Lukasiewicz, Synthesis and Properties of Cyclodextrin-Malic Acid Copolymers, 15th International Electronic Conference on Synthetic Organic Chemistry, Nov. 2011, pp. 1-8, Agricultural University in Krakow, Krakow Poland.
(Continued)

*Primary Examiner* — Taiwo Oladapo
(74) *Attorney, Agent, or Firm* — Pearne & Gordon, LLP

(57) ABSTRACT

The use of a cyclodextrin polycondensate or a composition comprising at least one cyclodextrin polycondensate, as an agent for capturing at least one substance chosen from a metal element and an organic molecule having an octanol/water partition coefficient, referred to as Log Kow, greater than or equal to 2, the cyclodextrin polycondensate being obtained by reacting the following compounds (A) to (C): (A) at least one cyclodextrin, (B) at least one linear, branched or cyclic polycarboxylic acid, that is saturated,
(Continued)

unsaturated or aromatic, and (C) at least one ethylene vinyl alcohol copolymer (EVOH).

15 Claims, 1 Drawing Sheet

(51) Int. Cl.

| | |
|---|---|
| C02F 1/70 | (2006.01) |
| B01D 53/64 | (2006.01) |
| B01J 20/24 | (2006.01) |
| C02F 1/28 | (2006.01) |
| C08K 5/092 | (2006.01) |
| C08L 29/04 | (2006.01) |
| C02F 101/30 | (2006.01) |
| C02F 101/32 | (2006.01) |
| C02F 101/34 | (2006.01) |
| C02F 101/36 | (2006.01) |
| C02F 101/20 | (2006.01) |
| C02F 101/22 | (2006.01) |

(52) U.S. Cl.
CPC ............ *C02F 1/70* (2013.01); *C08B 37/0012* (2013.01); *C08K 5/092* (2013.01); *C08L 29/04* (2013.01); *B01D 2257/60* (2013.01); *C02F 2101/20* (2013.01); *C02F 2101/203* (2013.01); *C02F 2101/22* (2013.01); *C02F 2101/306* (2013.01); *C02F 2101/322* (2013.01); *C02F 2101/327* (2013.01); *C02F 2101/345* (2013.01); *C02F 2101/36* (2013.01)

(58) Field of Classification Search
CPC ............ C02F 2101/22; C02F 2101/203; C02F 2101/36; C02F 2101/345; C02F 2101/322; C02F 2101/306; C08K 5/092; B01J 20/24; B01D 53/64; B01D 2257/60; C08B 37/0012
See application file for complete search history.

(56) References Cited

FOREIGN PATENT DOCUMENTS

| | | |
|---|---|---|
| WO | 2014/095426 A1 | 6/2014 |
| WO | 2014/095427 A1 | 6/2014 |
| WO | WO-2014095427 A1 * | 6/2014 |

OTHER PUBLICATIONS

Kasprzyk, Sorption Properties of β-Cyclodextrin-Citric Acid Derivatives, 14th International Electronic Conference on Synthetic Organic Chemistry, Nov. 2010, pp. 1-8, vol. 15, Politechnika Krakowska, Krakow Poland.

Bednarz, Chemical Structure of Poly(β-Cyclodextrin-co-Citric Acid), Journal of Applied Polymer Science, Jun. 2010, pp. 3511-3520, vol. 119, Wiley Periodicals, Inc., Published Online Sep. 29, 2010 WileyOnlineLibrary.com.

Zhao, Water-Insoluble β-Cyclodextrin Polymer Crosslinked by Citric Acid: Synthesis and Adsorption Properties Toward Phenol and Methylene Blue, J Incl Phenom Macrocycl Chem, 2008, pp. 195-201, DOI 10.1007/s10847-008-9507-4, Published Online Oct. 18, 2008, Springer Science + Business Media B.V.

Zhao, Comparative Study of Polymer Containing β-Cyclodrextrin and -COOH for Adsorption Toward Aniline, 1-Naphthylamine and Methylene Blue, Journal of Hazadous Materials, May 2009, pp. 241-246, DOI:10.1016/j.ihazmat.2009.5.134, 2009 Elsevier B.V., Available Online Jun. 6, 2009.

Ducoroy, Removal of Heavy Metals from Aqueous Media by Cation Exchange Nonwoven PET Coated with β-Cyclodextrin-Polycarboxylic Moieties, Reactive & Fuctional Polymers (2008) 594-600, Oct. 22, 2017, pp. 594-600, DOI:10.1016/j.reactfunctpolym.2007.10.033, Elsevier Ltd., Available Online Nov. 5, 2017.

Oughlis-Hammache, Synthesis and Characterization of Poly(Vinyl-Alcohol)-Poly(β-Cyclodextrin) Copolymer Membranes for Aniline Extraction, Membrane Water Treatment, 2016, pp. 223-240, vol. 7, No. 3(2016)223-240, DOI:http://dx.doi.org/10.12989/mwt.2016.7.3.223, Techno-Press, Ltd., ISSN: 2005-8624 (Print), 2092-7037 (Online).

Moulahcene et al., Inclusion and Removal of Pharmaceutical Residues From Aqueous Solution Using Water-Insoluble Cyclodextrin Polymers, Chemical Engineering Research and Design, 2014, pp. 1-14, vol. 57, http://dx.doi.org/10.1016/j.cherd, Elsevier B.V.

He et al., Oil-Absorbent Beads Containing β-Cyclodextrin Moieties: Preparation via Suspension Polymerization and High Oil Absorbency, Polym. Adv. Technol. 2012, vol. 23, pp. 810-816, 2011, pp. 810-816, DOI: 10.1002/pat.1975, John Wilye & Sons, Ltd., Published Online in Wiley Online Library, 2011 (wileyonlinelibrary.com).

Yamasaki et al., Preparation of Crosslinked β-Cyclodextrin Polymer Beads and Their Application as a Sorbent for Removal of Phenol from Wastewater, Department of Chemical and Biological Engineering, Ube National College of Technology, 2008, pp. 991-997, https://doi.org/10.1002/jctb.1904, Department of Chemical and Biological Engineering, Ube, Japan.

Mamba et al., Monofunctionalized Cyclodextrin Polymers for the Removal of Organic Pollutants from Water, Environ Chem Lett (2007) 5:79-84, 2006, pp. 79-84, DOI 10.1007/s10311-006-0082-x, Springer-Verlag, Johannesburg, South Africa.

Mamba et al., Application of Multiwalled Carbon Nanotube—Cyclodextrin Polymers in the Removal of Heavy Metals from Water, Journal of Applied Sciences, 2010, pp. 940-949, vol. 10, ISSN 1812-5654, Asian Network for Scientific Information, Johannesburg, South America.

Mamba et al., Removal of Geosmin and 2-Methylisorboneol (2-MIB) in Water From Zuikerbosch Treatment Plant (Rand Water) Using B-Cyclodextrin Polyurethanes, Water SA, 2007, pp. 223-228, vol. 33, Issue 2, ISSN 0378-4738, University of Johannesburg, Department of Chemical Technology, South Africa.

Janus et al., New Sorbents Containing Beta-Cyclodextrin. Synthesis, Characterization, and Sorption Properties, Reactive & Functional Polymers, 1999, pp. 173-180, vol. 42, doi.org/10.1016/S1381-5148(98)00066-2, Elsevier Science B.V.

Li et al., Study on Sorption of Chlorophenols from Aqueous Solutions by an Insoluble Copolymer Containing βCyclodextrin and Polyamidoamine Units, Chemical Engineering Journal, 2012, pp. 138-145, vol. 192, doi.org/10.1016/j.cej.2012.03.076, Elsevier B.V., Chongqing, China.

Li et al., Sorption Behaviors of Methylene Blue Onto β-Cyclodextrin Polymer, Advanced Materials Research, 2011, pp. 3032-3036, vol. 225-260, doi.org/10.4028/www.scientific.net/AMR.255-260.3032, Trans Tech Pulications, Switzerland.

Kozlowski et al., The Effect of β-CD Polymers Structure on the Efficiency of Copper(II) Ion Flotation, Journal of Inclusion Phenomena and Macrocyclic Chemistry, 2006, pp. 71-77, vol. 55, https://doi.org/10.1007/s10847-005-9020-y, Springer.

Sithole et al., Cyclodextrin Dendrimers Containing Nanocatalysts for the Removal of Natural Organic Matter (NOM) and Other Micropollutants from Water: A Short Review, Univeristy of Johannesburg pp. 1-9, University of Johannesburg.

Alsbaiee et al., Rapid Removal of Organic Micropollutants from Water by a Porous β-Cyclodextrin Polymer, Nature, 2015, pp. 1-4, vol. 000, doi:10.1038/nature16185, MacMillan Publishers Limited.

Martel, Water-Soluble Polymers and Gels from the Polycondensation between Cyclodextrins and Poly(carboxylic acids)s: A Study of the Preparation Parameters, Journal of Applied Polymer Science, 2005, pp. 433-442 vol. 97, https://doi.org/10.1002/app.21391, Wiley Periodicals, Inc.

Moulahcene, Cyclodextrin Polymers for Ibuprofen Extraction in Aqueous Solution: Recovery, Separation, and Characterization, Desalination and Water Treatment, 2015, pp. 11392-11402, vol. 57, Issue 24, DOI: 10.1080/19443994.2015.1048734, Balaban Desalination Publications.

(56) References Cited

OTHER PUBLICATIONS

Ozmen et al., Use of β-Cyclodextrin and Starch Based Polymers for Sorption of Congo Red from Aqueous Solutions, Journal of Hazardous Materials, 2007, pp. 303-310, vol. 148, doi:10.1016/j.jhazmat.2007.02.042, Elsevier B.V.

Appell et al., Synthesis and Evaluation of Cyclodextrin-Based Polymers for Patulin Extraction from Aqueous Solutions, Journal of Inclusion Phenomena and Macrocyclic Chemistry, 2010, pp. 117-122, vol. 68, doi:10.1007/s10847-010-9744-1, Springer.

Chin et al., Removal of Parabens from Aqueous Solution Using B-Cyclodextrin Cross-Linked Polymer, International Journal of Molecular Sciences, 2010, pp. 3459-3471, vol. 11, doi:10.3390/ijms11092459, Int. J. Mol Sci.

Yamasaki et al., Efficient Phenol Removal of Wastewater From Phenolic Resin Plants Using Crosslinked Cyclodextrin Particles, Journal of Chemical Technology and Biotechnology, 2006, pp. 1271-1276, vol. 81, doi.10.1002/jctb.1545, Wiley.

Dr Soraya Sithole-Malinga—Google Scholar Citations, https://scholar.google.com/citations?user-JvBx_kEAAAAJ&hl=th, dated Oct. 27, 2017.

International Search Report for International Patent Application No. PCT/EP2017/052434, dated May 3, 2017.

Written Opinion for International Patent Application No. PCT/EP2017/052434, dated May 3, 2017.

Preliminary French Search Report French Patent Application No. 16 50943, dated Jul. 5, 2016.

\* cited by examiner

US 10,851,223 B2

USE OF A CYCLODEXTRIN POLYCONDENSATE OR A COMPOSITION COMPRISING SUCH A POLYCONDENSATE, AS A CAPTURING AGENT

CROSS-REFERENCE TO RELATED APPLICATIONS

This is a National Stage application of PCT international application PCT/EP2017/052434, filed on Feb. 3, 2017, which claims the priority of French Patent Application No. 16 50943, filed Feb. 5, 2016, both of which are incorporated herein by reference in their entirety.

TECHNICAL FIELD

This invention relates to a cyclodextrin(s) polycondensate as well as to a composition comprising at least one such cyclodextrin(s) polycondensate.

This invention has, in particular, multiple applications in the field of decontaminating environments of substances that are contained therein and which are more or less harmful for human or animal health.

This invention more particularly relates to the uses of this cyclodextrin(s) polycondensate and of this composition comprising at least one cyclodextrin(s) polycondensate, as an agent for capturing substances, such as those mentioned hereinabove.

PRIOR ART

Currently, much research is being conducted with the purpose of decontaminating the air, water or ground, of substances that are introduced therein, directly or indirectly, by human activity, such substances being able, among other things, to harm human health, animal health as well as the quality of the aquatic, air and/or land ecosystems, and to generate a deterioration or a hindrance to the environmental amenity or to other legitimate uses of the latter.

Among the solutions proposed to date, materials are in particular proposed that make it possible to trap, in their matrix, a very large range of these substances or mixtures of these substances.

As such, document WO 2014-095427 A1, referenced as [1] in the rest of this description, relates to the use of a cyclodextrin polycondensate as an agent for capturing a substance or a mixture of substances that can pollute the environment.

Among the substances that can pollute the environment targeted by the document [1], are mentioned:
- gaseous pollutants (volatile organic compounds, also called VOC), among which chlorinated compounds such as chlorobenzene, carbon tetrachloride and vinyl monochloride,
- metal cations, such as the cations of lead, cadmium, mercury, iron and copper,
- oils and fats, of mineral, animal, plant, marine or synthetic origin, among which complex mixtures of petroleum hydrocarbons, such as fuels, lubricants and brake fluids, additives added in small quantities to improve the technical properties, for example octane enhancers, antioxidants, antifreeze, substitutes for lead and colouring agents,
- polluting substances contained in drinking water, industrial water and aqueous effluents, such as the natural malodorous pollutants of drinking water such as (−) geosmin and (+) 2-methylisoborneol,
- polluting substances contained in the ground, such as chlorophenols (tri- and pentachlorophenol) and polycyclic aromatic hydrocarbons (naphthalene, phenanthrene), and
- the surrounding volatile odorous molecules.

The cyclodextrin polycondensate described by the document [1] is obtained by reacting compounds (A) to (C) and, where applicable, (D), (E) and/or (F):
(A) at least one cyclodextrin,
(B) at least one linear, branched and/or cyclic polycarboxylic acid, that is saturated, unsaturated or aromatic and/or at least one ester, one anhydride or one halide of said polycarboxylic acid,
(C) at least one thermoplastic polyol polymer,
(D) optionally at least one esterification catalyst,
(E) optionally at least one cyclic anhydride of polycarboxylic acid chosen to be different from the polycarboxylic acid anhydride of paragraph B), and/or
(F) optionally at least one non-polymer polyol comprising from 3 to 6 hydroxyl groups.

Although it is described as able to be used as an agent for capturing a large number of substances that can pollute various environments, the cyclodextrin polycondensate described in the document [1] is however not used as an agent for capturing substances of the drug and/or pesticide type which, for some, are particularly difficult to trap and to extract from the environments in which they are present. The Inventors therefore set themselves the goal of developing a cyclodextrin(s) polycondensate as well as a composition comprising at least one of such cyclodextrin(s) polycondensate that can be used as a capturing agent making it possible to capture a large number of substances, among which metals with their degree of oxidation of 0 as well as substances of the drug and/or pesticide type.

DISCLOSURE OF THE INVENTION

The purpose mentioned hereinabove as well as others is achieved by the use of a cyclodextrin(s) polycondensate of the aforementioned type, or a composition comprising at least one cyclodextrin(s) polycondensate of the aforementioned type, i.e. by reacting the following compounds (A) to (C):
(A) at least one cyclodextrin,
(B) at least one linear, branched and/or cyclic polycarboxylic acid, that is saturated, unsaturated or aromatic, and
(C) at least one thermoplastic polyol polymer.

According to the invention, the thermoplastic polyol polymer (C) is an ethylene vinyl alcohol copolymer (EVOH) and the cyclodextrin(s) polycondensate obtained as such, or a composition comprising at least this cyclodextrin(s) polycondensate, is used as an agent for capturing at least one substance chosen from a metal element and an organic molecule having an octanol/water partition coefficient, referred to as Log Kow, greater than or equal to 2.

In the above and in what follows:
"polycondensate" means any polymer obtained by polymerisation via steps wherein each step is a condensation reaction, which is carried out with an elimination of water. Monomers with two or several functional groups react to form dimers first, then trimers and longer oligomers, and then long-chain polymers, and
"agent for capturing" means any chemical compound, in particular any polymer, capable of trapping a substance or a mixture of substances within its structure, of immobilising it and/or of delaying its release towards the outside. The cyclodextrin(s) polycondensate according to the invention has a porous network that combines super-absorbent properties of the sponge type with the ability to form inclusion complexes in the cavities of the cyclodextrin or cyclodextrins immobilised in the polymer network, as such making it possible to capture substances that have an affinity with said polymer network.

The Inventors indeed observed that, surprisingly and unexpectedly, this particular cyclodextrin(s) polycondensate makes it possible to capture, effectively, substances that are not described in the document [1], here metals or metal elements, noted as M, at their degree of oxidation 0 ($M^0$), as well as substances of the drug and pesticide type, which are known as being particularly difficult to trap and, consequently, to extract for the purposes of decontaminating the environment or the area wherein they are contained.

The cyclodextrin(s) polycondensate of which the use is the object of this invention is obtained by reacting the following compounds (A) to (C):
(A) at least one cyclodextrin,
(B) at least one linear, branched and/or cyclic polycarboxylic acid, that is saturated, unsaturated or aromatic, and
(C) at least one ethylene vinyl alcohol copolymer (EVOH).

In an advantageous alternative, the cyclodextrin(s) polycondensate is obtained by reacting the following compounds (A) to (C):
(A) at least one cyclodextrin,
(B) a saturated aliphatic polycarboxylic acid that is linear or branched, and
(C) an ethylene vinyl alcohol copolymer (EVOH).

The cyclodextrin (A) implemented in the framework of this invention is a compound of the general structure (I) hereinafter, or one of its derivatives of this compound such as methylated, hydroxyalkylated, sulfoalkylated, sulphated derivatives or cyclodextrins substituted by sugars:

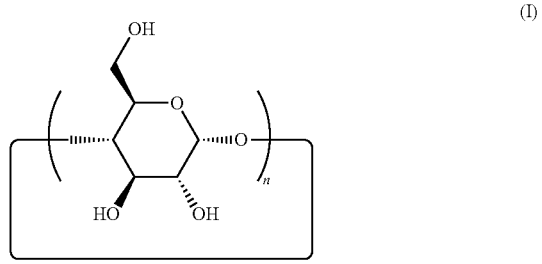

(I)

It is possible, in particular, to refer to the examples of cyclodextrins and of derivatives of cyclodextrins which are described in the document [1], from page 15, line 23 to page 16, line 5.

In an advantageous alternative of the invention, the cyclodextrin (A) is chosen from α-cyclodextrin, β-cyclodextrin and γ-cyclodextrin.

In a first embodiment of the invention, the cyclodextrin polycondensate is obtained by reacting compounds (A) to (C) implementing only one cyclodextrin (A).

This single cyclodextrin (A) can advantageously be α-cyclodextrin, β-cyclodextrin or γ-cyclodextrin.

In a second embodiment of the invention, the cyclodextrins polycondensate is obtained by reacting compounds (A) to (C) implementing a mixture of cyclodextrins (A), for example a mixture of two, three, even more, cyclodextrins (A).

In an advantageous alternative of this second embodiment of the invention, this mixture of cyclodextrins (A) comprises two or three cyclodextrins chosen from α-cyclodextrin, β-cyclodextrin and γ-cyclodextrin.

When this mixture of cyclodextrins (A) comprises two cyclodextrins, one of these two cyclodextrins is advantageously β-cyclodextrin. Such a mixture of cyclodextrins (A) can in particular include, based on the total weight of said mixture, the following mass proportions:
from 10% to 60% of β-cyclodextrin, and
from 40% to 90% of α-cyclodextrin or of γ-cyclodextrin.

The expression "from . . . to . . . ", which has just been used to define the intervals of the mass proportions and which is used in the rest of this application, must be understood as defining not only the values comprised within these intervals, but also the limits values of these intervals.

In this particular mixture of two cyclodextrins (A), the mass proportion of β-cyclodextrin can advantageously range from 20% to 50% and, preferably, from 25% to 40%, based on the total weight of said mixture of cyclodextrins.

In this particular mixture of two cyclodextrins (A), the mass proportion of α-cyclodextrin or of γ-cyclodextrin can advantageously range from 50% to 80% and, preferably, from 60% to 75%, based on the total weight of said mixture of cyclodextrins.

In a preferred alternative of this second embodiment of the invention, this mixture of cyclodextrins (A) is formed by the mixture of α-cyclodextrin, of β-cyclodextrin and of γ-cyclodextrin.

In this preferred alternative, the mixture of cyclodextrins (A) can include, based on the total weight of said mixture, the following mass proportions:
from 30% to 70% of α-cyclodextrin,
from 20% to 40% of β-cyclodextrin, and
from 10% to 30% of γ-cyclodextrin.

In this particular mixture of cyclodextrins (A), the mass proportion of α-cyclodextrin can advantageously range from 40% to 60% and, preferably, from 44% to 56%, based on the total weight of said mixture of cyclodextrins.

In this particular mixture of cyclodextrins (A), the mass proportion of β-cyclodextrin can advantageously range from 25% to 35% and, preferably, from 27% to 33%, based on the total weight of said mixture of cyclodextrins.

In this particular mixture of cyclodextrins (A), the mass proportion of γ-cyclodextrin can advantageously range from 15% to 25% and, preferably, from 17% to 23%, based on the total weight of said mixture of cyclodextrins.

The compound (B) implemented in the framework of this invention is a linear, branched or cyclic polycarboxylic acid, that is saturated, unsaturated or aromatic.

This or these polycarboxylic acids, which include at least two —COOH carboxyl groups, can be linear, branched and/or cyclic. They can also be saturated, unsaturated or aromatic. This or these polycarboxylic acids can include from 2 to 50, advantageously from 3 to 36, preferably from 4 to 18 and, more preferably, from 4 to 12 carbon atoms.

Reference can be made to the paragraphs on page 16, line 33 to page 17, line 20 of the document [1] for examples of polycarboxylic acid(s) (B) that can be implemented in the framework of this invention.

In an advantageous alternative of the invention, the compound (B) is a saturated aliphatic polycarboxylic acid that is linear or branched.

In a preferred alternative of the invention, the polycarboxylic acid (B) is chosen from malic acid, citric acid, aconitic acid, 1,2,3-propanetricarboxylic acid, 1,2,3,4-butanetetracarboxylic acid, oxydisuccinic acid and thiodisuccinic acid.

In a more particularly preferred alternative of the invention, the polycarboxylic acid (B) is citric acid.

The compound (C) implemented in the framework of this invention is an ethylene vinyl alcohol copolymer, known in abbreviated form as EVOH.

In an alternative of the invention, the cyclodextrin(s) polycondensate of which the use is the object of this invention is obtained by the reaction that implements, based on the total weight of the compounds (A) to (C), the following mass proportions of the compounds (A) to (C):
from 15% to 60% of one or several cyclodextrins (A),
from 0.5% to 12% of one or several compounds (B), and
from 39.5% to 84.5% of EVOH (C).

In this alternative of the invention, the mass proportion of the cyclodextrin or cyclodextrins (A) can advantageously range from 20% to 50% and, preferably, from 26% to 44%, based on the total weight of the compounds (A) to (C).

In this alternative of the invention, the mass proportion of the compound or compounds (B) can advantageously range from 1% to 8% and, preferably, from 2% to 6%, based on the total weight of the compounds (A) to (C).

In this alternative of the invention, the mass proportion of EVOH (C) can advantageously range from 49% to 79% and, preferably, from 54% to 72%, based on the total weight of the compounds (A) to (C).

In another alternative of the invention, the cyclodextrin(s) polycondensate can be obtained by the reaction implementing, not only the compounds (A), (B) and (C), but also at least one of the compounds chosen from the compounds (D), (E) and (F) described in the document [1].

The cyclodextrin(s) polycondensate implemented in the framework of this invention has the form of a solid compound which can advantageously be transformed, for example in the form of cakes, granules, powder or nanotubes. As this is a solid compound, the cyclodextrin(s) polycondensate can also be moulded.

The invention also relates to the use of a composition comprising at least one cyclodextrin(s) polycondensate such as defined hereinabove, with the precision that the advantageous and preferred characteristics described hereinabove in relation with the cyclodextrin(s) polycondensate can be taken individually or in combination.

As such, this composition comprises at least one cyclodextrin(s) polycondensate obtained by reacting the following compounds (A) to (C):
(A) at least one cyclodextrin,
(B) at least one linear, branched and/or cyclic polycarboxylic acid, that is saturated, unsaturated or aromatic, and
(C) at least one ethylene vinyl alcohol copolymer (EVOH).

In an advantageous alternative of the invention, the composition can further include one or several other compounds, this or these other compounds being able to confer properties that are complementary with those of the cyclodextrin(s) polycondensate(s), for example magnetic properties.

Such compounds can in particular be chosen from metal oxides (for example, titanium dioxide $TiO_2$), activated carbon, paints, magnetic compounds and antibacterial agents (for example, microparticles of silver or of copper).

As already indicated hereinabove, the invention relates to the use of a cyclodextrin(s) polycondensate such as defined hereinabove as well as to the use of a composition such as defined hereinabove as an agent for capturing.

As such, this cyclodextrin(s) polycondensate alone, or as a mixture with one or several other compounds in a composition, makes it possible to trap a substance or a mixture of substances within its structure, to immobilise it and/or to delay its release towards the outside.

In particular, the cyclodextrin(s) polycondensate and/or the composition comprising one or several cyclodextrin(s) polycondensate(s) can be used as an agent for capturing at least one substance chosen from a metal element and an organic molecule.

The Inventors have observed that using this cyclodextrin(s) polycondensate and/or this composition makes it possible to decontaminate an area of a substantial number of substances, whether these substances are present in the air, in the ground or in water such as, for example, in waste water, in river water, in drinking water or in osmotic water.

When the substance is a metal element, this metal element $M^0$ can in particular be chosen from aluminium, silver, iron, boron, tin, copper, zinc, lead, nickel, cadmium, chromium, mercury and gold.

When the substance is an organic molecule, this organic molecule has an octanol/water partition coefficient, referred to as Log Kow or Log P, greater than or equal to 2.

Recall that the octanol/water partition coefficient, or Log Kow, of a compound is a measurement of the differential solubility of this compound in two solvents, octanol and water. The Log Kow is determined by the following formula:

$$\text{Log } K_{ow} = \text{Log}(C_{oct}/C_{water})$$

wherein $C_{oct}$ represents the molar concentration of the compound in octanol, and
$C_{water}$ represents the molar concentration of the compound in water.

In an advantageous alternative of the invention, the cyclodextrin(s) polycondensate and the composition can be used as an agent for capturing at least one organic molecule having a Log Kow between 4 and 10 and, preferably, between 5 and 8.

In a preferred alternative of use according to the invention, the organic molecule is chosen from a herbicide such as diuron, a drug, for example an anticonvulsant drug such as carbamazepine, an endocrine disrupter such as polychlorinated biphenyls (PCB or pyralenes), phthalates and polycyclic aromatic hydrocarbons (PAH) such as benzopyrene, these organic molecules being known for being particularly difficult to decontaminate from the areas containing them.

In particular, the cyclodextrin(s) polycondensate according to the invention is particularly effective as an agent for capturing polychlorophenyl congeners known in abbreviated form as PCB 28, PCB 52, PCB 101, PCB 118, PCB 138, PCB 153 and PCB 180.

Other characteristics and advantages of the invention shall appear when reading the following complement of the description, which is given in reference to the accompanying FIGS. 1 and 2, and which relates to an example for preparing four cyclodextrin(s) polycondensates as well as to examples of use that make it possible to illustrate the performance of these four cyclodextrin(s) polycondensates in decontaminating aqueous solutions initially containing metal elements and different organic molecules such as pesticides and drugs.

Of course, these examples are given only as an illustration of the object of the invention and do not form, in any case, a limitation of this object.

DETAILED DESCRIPTION OF PARTICULAR EMBODIMENTS

Example 1: Preparation of Cyclodextrin(S) Polycondensates

Three cyclodextrin polycondensates noted as P1, P2 and P3, and a cyclodextrins polycondensate, noted as P4, were prepared using the mass proportions of the compounds (A) to (C) such as mentioned in the table 1 hereinbelow.

TABLE 1

| | (A) | | | | |
|---|---|---|---|---|---|
| Compounds | α-cyclodextrin (%) | β-cyclodextrin (%) | γ-cyclodextrin (%) | (B) citric acid (%) | (C) EVOH (%) |
| P1 | 28.6 | — | — | 3.0 | 68.4 |
| P2 | — | 28.6 | — | 3.0 | 68.4 |
| P3 | — | — | 28.6 | 3.0 | 68.4 |
| P4 | 14.3 | 8.6 | 5.7 | 3.0 | 68.4 |

Each one of these cyclodextrin(s) polycondensates P1 to P4 has the form of a solid yellow block.

Example 2: Decontamination of Aqueous Solutions Containing Metal Elements

Nickel Ni and lead Pb, at the degree of oxidation 0, are substances that are very commonly found in waste water and in drinking water.

In order to examine the effectiveness, as capturing agent, of cyclodextrin polycondensate P2 prepared hereinabove then ground in the form of a powder having an average particle size of 1 mm, three aqueous solutions, noted as S1 to S3, were prepared:

the solution S1 contains 0.1 g/L of $Ni^0$ and 0.1 g/L of $Pb^0$ in waste water, the solution S2 contains 0.1 g/L of $Ni^0$ and 0.1 g/L of $Pb^0$ in drinking water, and the solution S3 contains 0.5 g/L of $Ni^0$ and 0.5 g/L of $Pb^0$ in drinking water.

Figure 1:
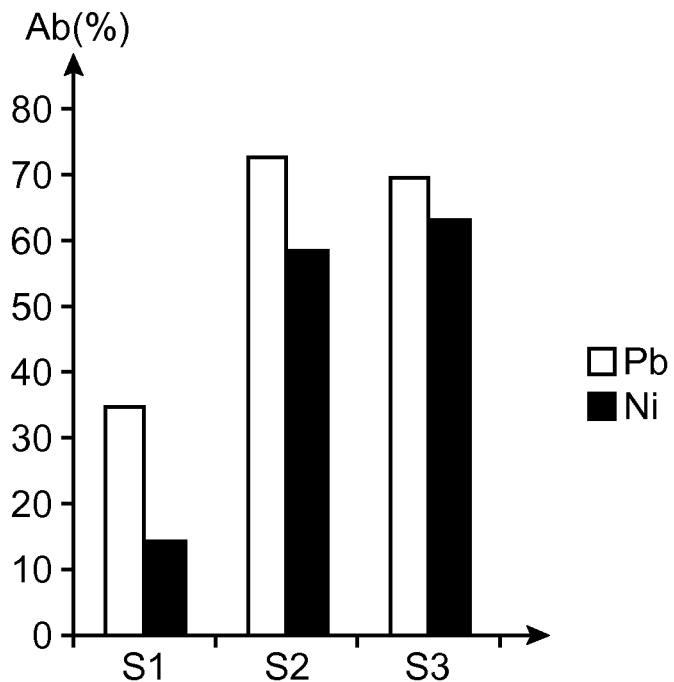
FIG. 1 is a histogram showing the abatement rates, noted as Ab and expressed as a %, showing the residual mass concentrations in Pb and in Ni in relation to their initial mass concentrations in each one of the solutions S1 to S3.

In reference to FIG. 1, it is observed that abatements are obtained ranging between 35% and more than 70% for lead and between 14% and 63% for nickel, the highest values being reached when these metal elements are contained in drinking water.

Example 3: Decontamination of Aqueous Solutions Containing Organic Molecules Diuron is a pesticide with empirical formula $C_9H_{10}Cl_2N_2O$, of a Log Kow of 2.68, that is frequently detected in water resources that can be used for the production of water intended for human consumption.

Carbamazepine is a drug with empirical formula $C_{15}H_{12}N_2O$, of a Log Kow of 2.45, that is frequently found in waste water, in river water and in some drinking water.

As these substances are both considered as particularly harmful for wildlife and, what is more, as they are not treated by water treatment plants, there is a major interest in decontaminating them from the areas that contain them.

In order to examine the effectiveness, as capturing agent, of the cyclodextrin polycondensate P2 prepared hereinabove then ground in the form of powder having an average particle size of 1 mm, two aqueous solutions, noted as S4 and S5, were prepared:

the solution S4 contains 0.1 g/L of diuron and 0.1 g/L of carbamazepine in waste water, and the solution S5 contains 0.5 g/L of diuron and 0.5 g/L of carbamazepine in drinking water.

Figure 2:
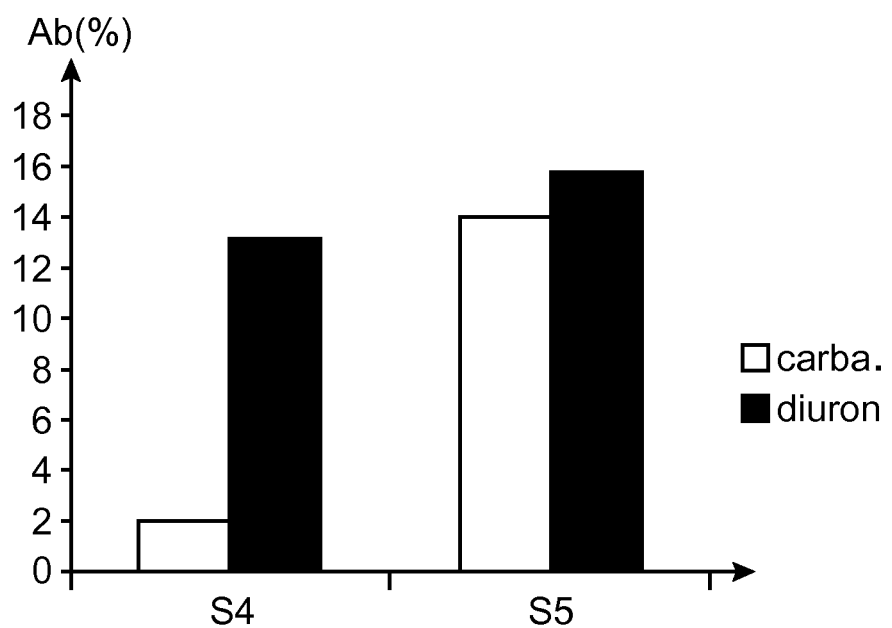
FIG. 2 is a histogram showing the abatement rates, noted Ab and expressed as a %, showing the residual mass concentrations in diuron, noted as "diuron", and in carbamazepine, noted as "carba", in relation to their initial mass concentrations in each one of the solutions S4 and S5.

In reference to FIG. 2, it is observed that abatements are obtained ranging between 3% and 15% for diuron and between 2% and 14% for carbamazepine, the highest values being reached when these metal substances are contained in an initial mass concentration of 0.5 g/L.

Although the abatement rates of this example are lower than those reached in the example 2 hereinabove, they remain however interesting with regards to the dangerousness of these two substances, diuron and carbamazepine.

Example 4: Decontamination of Aqueous Solutions Containing Organic Molecules In this example, the tests were conducted using aqueous solutions, noted as S6 to S14, comprising water taken from the outlet of La Folie treatment plant, in Poitiers (France) and separated from any of its suspended matter, via settling.

The cyclodextrin(s) polycondensates P1 to P4 obtained in the example 1 hereinabove were ground in the form of a powder of an average particle size of 1 mm then subjected to successive washings with demineralised water, at a rate of 3.49650 g/L of demineralised water.

The operating protocol followed is the same for all of the tests, which moreover were conducted at a temperature between 10° C. and 15° C.

Stock solutions of the substances to be studied were prepared in organic solvents. Aliquots of each one of these stock solutions are added to 1.5 L of the water taken and settled, noted as E, in order to reach mass concentrations of 5 µg/L of water E in the aqueous solutions S6 to S14 constituted as such.

0.5 mL of each one of these aqueous solutions were introduced into 3 series of glass bottles, noted as F1, F2 and F3.

Into each of the bottles F1 to F3, 3.49650 g/L of cyclodextrin polycondensate P1, P2 or P3 and 4.789270 g/L of the cyclodextrins polycondensate P4 were introduced.

The bottles F1 are briefly stirred while the bottles F2 and F3 are placed under stirring by turning over at a speed of 10 rpm, for 10 min for the bottles F2 and for 60 min for the bottles F3.

At the end of these stirrings and after a settling for 10 min, the water is recovered for analysis.

The solutions S6 to S14 prepared as such are mentioned in the table 2 hereinbelow.

TABLE 2

| Aqueous solutions | Substances | Family | Log Kow |
|---|---|---|---|
| S6 | PCB 28 | polychlorinated biphenyls | 5.62 |
| S7 | PCB 52 | polychlorinated biphenyls | 6.12 |
| S8 | PCB 101 | polychlorinated biphenyls | 6.8 |
| S9 | PCB 118 | polychlorinated biphenyls | 6.84 |
| S10 | PCB 138 | polychlorinated biphenyls | 7.25 |
| S11 | PCB 153 | polychlorinated biphenyls | 7.21 |
| S12 | PCB 180 | polychlorinated biphenyls | 7.7 |
| S13 | benzopyrene | polycyclic aromatic hydrocarbons | 6.07 |
| S14 | di(2-ethylhexyl)-phthalate | phthalates | 7.6 |

The tests were conducted with each one of the cyclodextrin(s) polycondensates P1 to P4. The residual mass concentrations in substances measured in the residual water of the bottles F1 to F3, as well as the corresponding abatement rates after 60 min of stirring, are indicated in the tables 3 to 6 hereinafter.

TABLE 3

| Compound | Aqueous solutions | Mass concentration (µg/L) 0 min | 10 min | 60 min | Abatement rate at 60 min (%) |
|---|---|---|---|---|---|
| P1 | S6 | 2.8 | 1.3 | 1.1 | 60 |
|  | S7 | 3.2 | 1.8 | 1.4 | 56 |
|  | S8 | 3.3 | 2.9 | 2.5 | 24 |
|  | S9 | 4.3 | 4.8 | 3.9 | 9 |
|  | S13 | 5.0 | 5.7 | 4.5 | 10 |
|  | S14 | 4.9 | 4.2 | 4.5 | 8 |

TABLE 4

| Compound | Aqueous solutions | Mass concentration (µg/L) 0 min | 10 min | 60 min | Abatement rate at 60 min (%) |
|---|---|---|---|---|---|
| P2 | S6 | 2.6 | 1.9 | 1.2 | 54 |
|  | S7 | 3.1 | 2.3 | 1.6 | 48 |
|  | S8 | 3.6 | 2.8 | 2.2 | 39 |
|  | S9 | 5 | 4.3 | 3.3 | 34 |
|  | S10 | 4.9 | 4.7 | 3.9 | 20 |
|  | S11 | 4.6 | 4.4 | 3.9 | 15 |
|  | S13 | 5.2 | 4.3 | 2.1 | 60 |
|  | S14 | 5.2 | 4.5 | 4.1 | 21 |

TABLE 5

| Compound | Aqueous solutions | Mass concentration (µg/L) 0 min | 10 min | 60 min | Abatement rate at 60 min (%) |
|---|---|---|---|---|---|
| P3 | S6 | 2.9 | 1.9 | 1.3 | 55 |
|  | S7 | 3.3 | 2.6 | 1.9 | 42 |
|  | S8 | 3.5 | 2.8 | 2.4 | 31 |
|  | S9 | 4.6 | 4.2 | 3.5 | 24 |
|  | S11 | 4.3 | 4.2 | 4.0 | 7 |
|  | S13 | 4.9 | 4.8 | 3.7 | 24 |
|  | S14 | 4.4 | 4.6 | 4.1 | 7 |

TABLE 6

| Compound | Aqueous solutions | Mass concentration (µg/L) 0 min | 10 min | 60 min | Abatement rate at 60 min (%) |
|---|---|---|---|---|---|
| P4 | S6 | 2.1 | 2.1 | 1.4 | 29 |
|  | S7 | 2.6 | 2.7 | 2.0 | 23 |
|  | S8 | 3.7 | 2.9 | 2.2 | 40 |
|  | S9 | 5.7 | 3.8 | 3.1 | 46 |
|  | S10 | 6.2 | 4.1 | 3.6 | 42 |
|  | S11 | 5.6 | 3.9 | 3.5 | 38 |
|  | S12 | 7.5 | 5.2 | 5.0 | 33 |
|  | S13 | 5 | 3.9 | 2.7 | 46 |
|  | S14 | 5.3 | 4.5 | 4.0 | 25 |

Good abatement rates of the different substances present in the aqueous solutions S6 to S14 are observed.

Note, as examples:

that the cyclodextrin polycondensate P1 is more effective on the substances PCB 28 and PCB 52 (aqueous solutions S6 and S7) than the other cyclodextrin(s) polycondensates P2, P3 and P4, that the cyclodextrin polycondensate P2 is more effective on the substances PCB 101 and PCB 118 (aqueous solutions S8 and S9) than the other cyclodextrin polycondensates P1 and P3, and that the cyclodextrins polycondensate P4 offers a very satisfactory effectiveness on all of the substances.

The choice of the cyclodextrin(s) polycondensate can therefore be optimised according to the nature of the substances of which the areas must be decontaminated.

BIBLIOGRAPHY

[1] WO 2014/095427 A1

The invention claimed is:

1. A method of sequestering a pollutant, comprising:
    contacting said pollutant with a cyclodextrin(s) polycondensate, or a composition comprising at least one cyclodextrin(s) polycondensate,
    wherein the pollutant comprises at least one substance chosen from a metal element at the degree of oxidation 0 and an organic molecule selected from the group consisting of diuron, carbamazepine, polychlorinated biphenyls, phthalates and benzopyrene, and
    wherein the cyclodextrin(s) polycondensate is obtained by reacting the following compounds (A) to (C):
    (A) at least one cyclodextrin,
    (B) a saturated aliphatic polycarboxylic acid that is linear or branched, and
    (C) at least one ethylene vinyl alcohol copolymer (EVOH).

2. The method according to claim 1, wherein the pollutant is a metal element at the degree of oxidation 0 selected from the group consisting of aluminum, silver, iron, boron, tin, copper, zinc, lead, nickel, cadmium, chromium, mercury and gold.

3. The method according to claim 1, wherein the pollutant is present in the air, in the ground or in water.

4. The method according to claim 1, wherein the composition further comprises at least one compound chosen from metal oxides, activated carbon, paints, magnetic compounds and antibacterial agents.

5. The method according to claim 1, wherein the compound (B) is selected from the group consisting of malic acid, citric acid, 1,2,3-propanetricarboxylic acid, 1,2,3,4-butanetetracarboxylic acid, oxydisuccinic acid and thiodisuccinic acid.

6. The method according to claim 1, wherein the cyclodextrin is chosen from the group consisting of α-cyclodextrin, β-cyclodextrin and γ-cyclodextrin.

7. The method according to claim 1, wherein the reaction comprises one cyclodextrin.

8. The method according to claim 1, wherein the reaction comprises a mixture of cyclodextrins.

9. The method according to claim 8, wherein the mixture comprises, based on the total weight of said mixture, the following mass proportions:
from 10% to 60% of β-cyclodextrin, and
from 40% to 90% of α-cyclodextrin or of γ-cyclodextrin.

10. The method according to claim 9, wherein the mixture comprises, based on the total weight of said mixture, the following mass proportions:
from 25% to 40% of β-cyclodextrin, and
from 60% to 75% of α-cyclodextrin or of γ-cyclodextrin.

11. The method according to claim 8, wherein the mixture comprises, based on the total weight of said mixture, the following mass proportions:
from 30% to 70 of α-cyclodextrin,
from 20% to 40% of β-cyclodextrin, and
from 10% to 30% of γ-cyclodextrin.

12. The method according to claim 11, wherein the mixture comprises, based on the total weight of said mixture, the following mass proportions:
from 44% to 56% of α-cyclodextrin,
from 27% to 33% of β-cyclodextrin, and
from 17% to 23% of γ-cyclodextrin.

13. The method according to claim 1, wherein the compound (B) is citric acid.

14. The method according to claim 1, wherein the reaction comprises, based on the total weight of the compounds (A) to (C), the following mass proportions:
from 15% to 60 of one or several cyclodextrins,
from 0.5% to 12 of one or several compounds, and
from 39.5% to 84.5%, of EVOH.

15. The method according to claim 14, wherein the reaction comprises, based on the total weight of the compounds (A) to (C), the following mass proportions:
from 26% to 44% of one or several cyclodextrins,
from 2% to 6% of one or several compounds, and
from 54% to 72% of EVOH.

* * * * *